John C. Love,
Lamp Burner.

No. 2,901. Reissued Mar 24. 1868.

Witnesses { Wm. Albert Steel. John Parker }

J. C. Love
By his Atty
H. Howson

United States Patent Office.

W. H. LOVE, R. H. CHILDS, AND H. W. CHILDS, OF PHILADELPHIA, PENNSYLVANIA, ASSIGNEES BY MESNE ASSIGNMENTS OF JOHN C. LOVE, OF SAME PLACE.

*Letters Patent No.* 72,209, *dated December* 17, 1867; *reissue No.* 2,901, *dated March* 24, 1868.

IMPROVEMENT IN LAMP-BURNERS.

The Schedule referred to in these Letters Patent and making part of the same.

TO ALL WHOM IT MAY CONCERN:

Be it known that JOHN C. LOVE, of Philadelphia, Pennsylvania, invented certain Improvements in Lamp-Burners, for which Letters Patent of the United States were granted to us, on the 17th day of December, A. D. 1867; and we do hereby declare the following to be a full, clear, and exact description of the said invention.

The invention of the said J. C. LOVE consists of a burner for coal-oil lamps, constructed substantially as lescribed hereafter, so that a broad and brilliant flame, of such a shape as to allow of the use of a cylindrical chimney, may be obtained.

In order to enable others skilled in the arts to make and use the invention, we will now proceed to describe its construction and operation, reference being had to the accompanying drawing, which forms a part of this specification, and in which—

Figure 1:
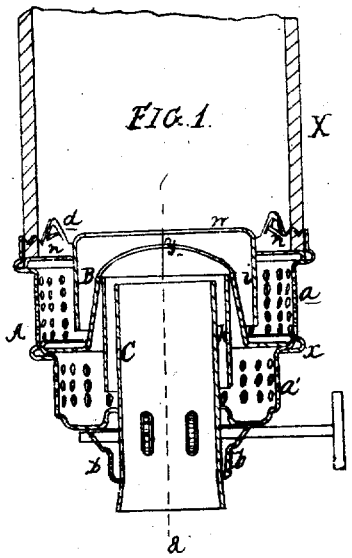

Figure 1 is a sectional elevation of the improved lamp-burner.

Figure 2:
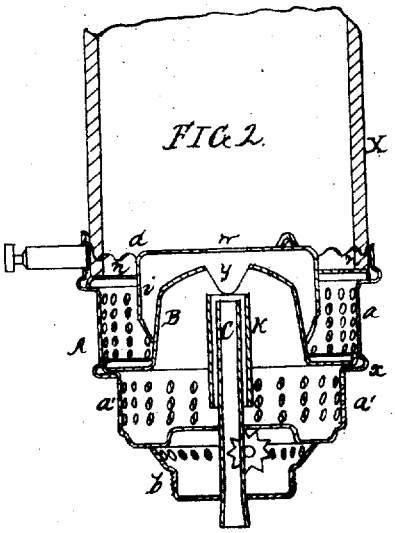

Figure 2, a section on the line 1 2, fig. 1.

Figure 3:
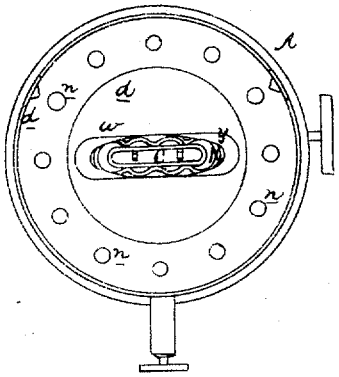

Figure 3, a plan view of fig. 1; and

Figure 4:
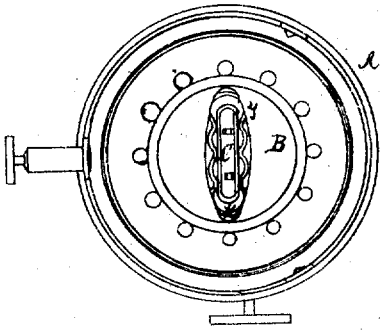

Figure 4, a plan view of fig. 2, a portion of the burner being removed.

A is the cylindrical perforated casing of the burner, at the lower end of which is a tubular screw or projection, *b*, adapted to the cap of an oil-reservoir. The upper portion, *a*, of the casing A is larger in diameter than the lower portion, *a'*, and on the shoulder or ledge *x*, formed by this contraction in the size of the casing, leaves a flange at the lower edge of a dome, B, the opening *y* in the latter being directly above the upper end of a wick-tube, C, which extends through the bottom of the burner. On a ledge, *t*, near the upper edge of the burner, and level with or above the top of the wick-tube, rests a plate, *d*, the central portion of which is elevated, as shown in the drawing, so as to form a circular projection, and in the latter is an elongated opening, *w*, which is directly above the opening *y* in the dome. From the under side of the plate *d* projects a flange, *i*, which extends almost to the base of the dome B. The upper end of the wick-tube C is surrounded by a short tube, *k*, and between the latter and the wick-tube is a space through which currents of air can pass upwards. In the present instance, there are a number of openings in the dome B, and near the edge of the plate *d* are a number of openings, *n*. At the upper edge of the case A is a rim or flange, which serves to retain in its place the cylindrical glass chimney X, and through the projection *b* passes a shaft, *m*, toothed wheels on which project through slots in the wick-tube.

As the flame passes through the opening in the curved top of the dome, it is spread or increased in width. In passing through the opening *n* in the plate *d*, however, its form is changed, its edges being brought parallel to each other, so that a cylindrical chimney, which is much less liable to break than the ordinary swelled chimneys, may be used. If desired, the dome B may be dispensed with, and the slotted plate *d*, with its flange *i*, may be employed alone.

Inasmuch as the ledge *t*, on which the plate supporting the chimney rests, is level with or above the top of the wick-tube, the flame is so near the base of the chimney that the latter is almost uniformly heated throughout, instead of being cooler at the base, as in ordinary burners, and is therefore much less liable than the latter to be broken by contracting or expanding unequally.

We claim as the invention of the said J. C. LOVE, and desire to secure by Letters Patent—

1. A flat slotted plate, *d*, arranged above the dome B of a lamp-burner, as and for the purpose described.

2. The plate *d*, with its flange *i* and opening *n*, in combination with the casing A of a lamp-burner, when the edges of the said opening *w* are parallel to the upper edge of the wick-tube, as set forth.

In testimony whereof, we have signed our names to this specification before two subscribing witnesses.

W. H. LOVE,
R. H. CHILDS,
H. W. CHILDS.

Witnesses:
JOHN WHITE,
CHARLES E. FOSTER.